United States Patent
Sullivan et al.

(10) Patent No.: US 12,466,383 B2
(45) Date of Patent: Nov. 11, 2025

(54) CONTROL SYSTEM FOR TORQUE SOURCE INERTIA COMPENSATION, METHOD, VEHICLE AND COMPUTER PROGRAM

(71) Applicant: JAGUAR LAND ROVER LIMITED, Coventry (GB)

(72) Inventors: Matthew Sullivan, Hinckley (GB); Olivier Roques, Banbury (GB); Matthew Hancock, Rugby (GB); William Harrison, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 329 days.

(21) Appl. No.: 17/920,743

(22) PCT Filed: Apr. 21, 2021

(86) PCT No.: PCT/EP2021/060454
§ 371 (c)(1),
(2) Date: Oct. 21, 2022

(87) PCT Pub. No.: WO2021/214184
PCT Pub. Date: Oct. 28, 2021

(65) Prior Publication Data
US 2023/0166714 A1   Jun. 1, 2023

(30) Foreign Application Priority Data
Apr. 21, 2020   (GB) ..................... 2005798

(51) Int. Cl.
*B60W 20/11* (2016.01)
*B60W 10/06* (2006.01)
*B60W 10/08* (2006.01)
*B60W 20/30* (2016.01)
*B60W 30/20* (2006.01)

(52) U.S. Cl.
CPC ............ *B60W 20/11* (2016.01); *B60W 10/06* (2013.01); *B60W 10/08* (2013.01); *B60W 20/30* (2013.01);
(Continued)

(58) Field of Classification Search
CPC ...... B60W 20/11; B60W 10/06; B60W 10/08; B60W 20/30; B60W 30/20;
(Continued)

(56) References Cited

U.S. PATENT DOCUMENTS 7,189,177 B2 * 3/2007 Takasu ............... B60K 6/40
475/5
7,742,851 B2 * 6/2010 Hisada ............... B60K 6/445
180/65.21
(Continued)

FOREIGN PATENT DOCUMENTS

| EP | 2450252 A1 | 5/2012 |
|---|---|---|
| WO | 2019146350 A | 8/2019 |
| WO | 2020043971 A1 | 3/2020 |

OTHER PUBLICATIONS

Written Opinion for application No. PCT/EP2021/060454, dated Jul. 15, 2021, 6 pages.
(Continued)

*Primary Examiner* — Tuan C To
*Assistant Examiner* — Dominick Mulder
(74) *Attorney, Agent, or Firm* — TROUTMAN PEPPER LOCKE LLP; Dustin B. Weeks; Nicholas H. Doss

(57) ABSTRACT

Aspects of the present invention relate to method and to a control system for compensating for variable inertia in a vehicle powertrain, the method comprising: determining whether a torque source is coupled to a wheel; and applying a torque change in dependence on angular acceleration
(Continued)

associated with the torque source, in dependence on whether the torque source is coupled to the wheel.

11 Claims, 3 Drawing Sheets

(52) U.S. Cl.
CPC ..... *B60W 30/20* (2013.01); *B60W 2510/0208* (2013.01); *B60W 2510/0652* (2013.01); *B60W 2510/0695* (2013.01); *B60W 2510/1005* (2013.01); *B60W 2510/1045* (2013.01); *B60W 2710/0666* (2013.01); *B60W 2710/083* (2013.01)

(58) Field of Classification Search
CPC . B60W 2510/0208; B60W 2510/0652; B60W 2510/0695; B60W 2510/1005; B60W 2510/1045; B60W 2710/0666; B60W 2710/083; B60W 2050/0039; B60W 2050/0041; B60W 2540/10; B60W 20/19; B60K 6/448; B60K 6/48; Y02T 10/40; Y02T 10/62
USPC .......................................................... 701/22
See application file for complete search history.

(56) References Cited

U.S. PATENT DOCUMENTS

| | | | | |
|---|---|---|---|---|
| 2004/0094342 | A1* | 5/2004 | Kowatari | B60K 28/16 180/65.265 |
| 2004/0134697 | A1* | 7/2004 | Kobayashi | B60K 6/485 903/917 |
| 2005/0203679 | A1* | 9/2005 | Hisada | B60K 6/445 701/22 |
| 2005/0203680 | A1* | 9/2005 | Hisada | B60W 20/00 701/22 |
| 2005/0283283 | A1* | 12/2005 | Hisada | B60W 20/10 180/65.235 |
| 2006/0021811 | A1* | 2/2006 | Kuang | B60K 6/445 180/65.285 |
| 2008/0214352 | A1* | 9/2008 | Ebner | B60W 30/18127 903/906 |
| 2011/0035127 | A1* | 2/2011 | Ishikawa | F16H 59/66 701/65 |
| 2013/0218381 | A1* | 8/2013 | Shinohara | B60K 6/52 701/22 |
| 2014/0088808 | A1 | 3/2014 | Kawasaki | |
| 2017/0334447 | A1* | 11/2017 | Bang | B60W 10/08 |
| 2018/0072301 | A1 | 3/2018 | Itagaki | |
| 2019/0023257 | A1 | 1/2019 | Doering et al. | |
| 2019/0248362 | A1 | 8/2019 | Moteki et al. | |
| 2020/0298821 | A1* | 9/2020 | Oh | B60W 10/08 |

OTHER PUBLICATIONS

International Search Report for application PCT/EP2021/060454, dated Jul. 15, 2021, 12 pages.
Combined Search and Examination Report for appliction No. GB2005798.0, dated Sep. 4, 2020, 6 pages.
European Office Action corresponding to application 21721466.7, dated Feb. 7, 2025, 6 pages.

* cited by examiner

CONTROL SYSTEM FOR TORQUE SOURCE INERTIA COMPENSATION, METHOD, VEHICLE AND COMPUTER PROGRAM

TECHNICAL FIELD

The present disclosure relates to an inertia compensation control method for vehicles. In particular, but not exclusively it relates to an inertia compensation control method for hybrid electric vehicles.

BACKGROUND

When a torque source such as an internal combustion engine ('engine') produces torque to accelerate a vehicle, not all of the torque produced is used for propulsion. A portion of the torque is consumed by frictional losses, another portion is used to power ancillaries, and another portion is used to overcome the inertia of spinning and reciprocating components. In an internal combustion-engined vehicle, those components include pistons, connecting rods, the crankshaft, and the transmission, for example.

For a conventional vehicle with a single torque source, the inertia is not accounted for and forms a consistent part of the character of the vehicle.

If the vehicle has a second torque source, such as an electric machine, that can drive the vehicle while the first torque source is disconnected from wheels of the vehicle, the vehicle may respond inconsistently to a given torque request. One reason is that the inertia of the first torque source is removed, and the inertia added by the second torque source may be different. For example, electric machines have less inertia than engines and accelerate faster.

SUMMARY OF THE INVENTION

It is an aim of the present invention to address one or more of the disadvantages associated with the prior art. The present invention provides a more consistent response to a torque input.

Aspects and embodiments of the invention provide a control system, a system, a vehicle, a method, and computer software as claimed in the appended claims.

According to an aspect of the invention there is provided a control system for compensating for variable inertia in a vehicle powertrain, the control system comprising one or more controllers, wherein the control system is configured to: determine whether a torque source is coupled to a wheel; and apply a torque change in dependence on angular acceleration associated with the torque source, in dependence on whether the torque source is coupled to the wheel.

An advantage is a more consistent response to a change in torque request, because a compensation (torque change) based on inertial effects (angular acceleration) is conditionally applied based on whether the torque source is coupled to the wheel (or wheels).

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to control determining and the applying.

The torque change may be applied in combination with a load-based torque request. An advantage is more consistent acceleration of the vehicle.

The torque change may comprise a torque increase applied when the torque source is coupled to the wheel. At least part of the torque change may be provided by the torque source. An advantage is a faster response of the torque source. The torque change may not be applied when the torque source is not coupled to the wheel. Alternatively, the torque change may comprise a torque decrease applied when the torque source is not coupled to the wheel.

At least part of the torque change may be provided by a second torque source. The second torque source may be coupled to a second wheel at a different end of the vehicle (front or rear). The torque change may be distributed between the torque source and the second torque source.

The torque source may comprise an internal combustion engine. The second torque source may comprise an electric machine. The electric machine may have a different (e.g. lower) moment of inertia than the engine. Alternatively, the vehicle may be an all-electric vehicle with at least two electric machines having substantially different speed ratios and/or inertias.

The control system may be configured to determine whether the vehicle is in a first vehicle operating mode or in a second vehicle operating mode, wherein in the first vehicle operating mode the torque source is coupled to the wheel, and wherein the second vehicle operating mode the torque source is not coupled to the wheel. The torque change may be applied if the vehicle is in the first vehicle operating mode.

The torque change may be further dependent on inertia of the torque source, as well as the angular acceleration of the torque source as stated above. The inertia is indicative of the moment of inertia of at least the torque source. Therefore, the torque change may be the product of the moment of inertia and the angular acceleration of the torque source, resulting in a torque required for overcoming inertia. An advantage is a more consistent response of the vehicle regardless of whether the torque source is coupled to the wheel.

The angular acceleration may be detected angular acceleration. Although the angular acceleration could be measured at the torque source, in some examples the angular acceleration may be measured at a location downstream of an output of the torque source. An advantage is a smoother signal resulting in less fluctuation of the torque change. The location may be at an output of a transmission of the vehicle, or between said output and the wheel. The location may be downstream of at least one gear train, and wherein the angular acceleration may be dependent on a gear ratio of the at least one gear train to indicate angular acceleration of the torque source.

The control system may be configured to determine whether the angular acceleration is positive so that speed of the torque source is increasing, or negative so that speed of the torque source is decreasing, wherein the torque change is applied when the angular acceleration is positive, and wherein the torque change is not applied when the angular acceleration is negative.

According to an aspect of the invention there is provided a system comprising the control system and the torque source.

According to an aspect of the invention there is provided a vehicle comprising the control system or the system.

According to an aspect of the invention there is provided a method of compensating for variable inertia in a vehicle powertrain, wherein the method comprises: determining whether a torque source is coupled to a wheel; and applying a torque change in dependence on angular acceleration associated with the torque source, in dependence on whether the torque source is coupled to the wheel.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
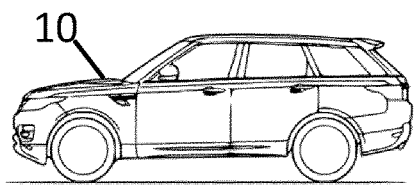
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 may be a hybrid electric vehicle (HEV). If the vehicle 10 is an HEV, the vehicle 10 may be a full HEV or a mild HEV. Mild HEVs do not have an electric-only mode of propulsion, but the electric machine may be configured to provide assistance such as boosting output torque of the engine. Full HEVs have an electric-only mode of propulsion.

If the vehicle 10 is an HEV, the vehicle 10 may be configured to operate as a parallel HEV. Parallel HEVs comprise a torque path between the engine and at least one vehicle wheel, as well as a torque path between an electric machine and at least one vehicle wheel. The torque path(s) may be disconnectable by a torque path connector such as a clutch. Parallel HEVs differ from series HEVs, because in series HEVs the purpose of the engine is to generate electrical energy and there is no torque path between the engine and vehicle wheels. However, some types of parallel HEVs may be configurable to operate as a series HEV, such as 'through-the-road' hybrids. In this case we may usefully describe such a hybrid vehicle as operating in a parallel HEV mode or in a series HEV mode, depending on whether torque is being delivered from the engine directly to the vehicle wheels.

In some, but not necessarily all examples, the vehicle 10 is a battery electric vehicle (BEV) having no internal combustion engine and an electric machine(s) instead.

Figure 2:
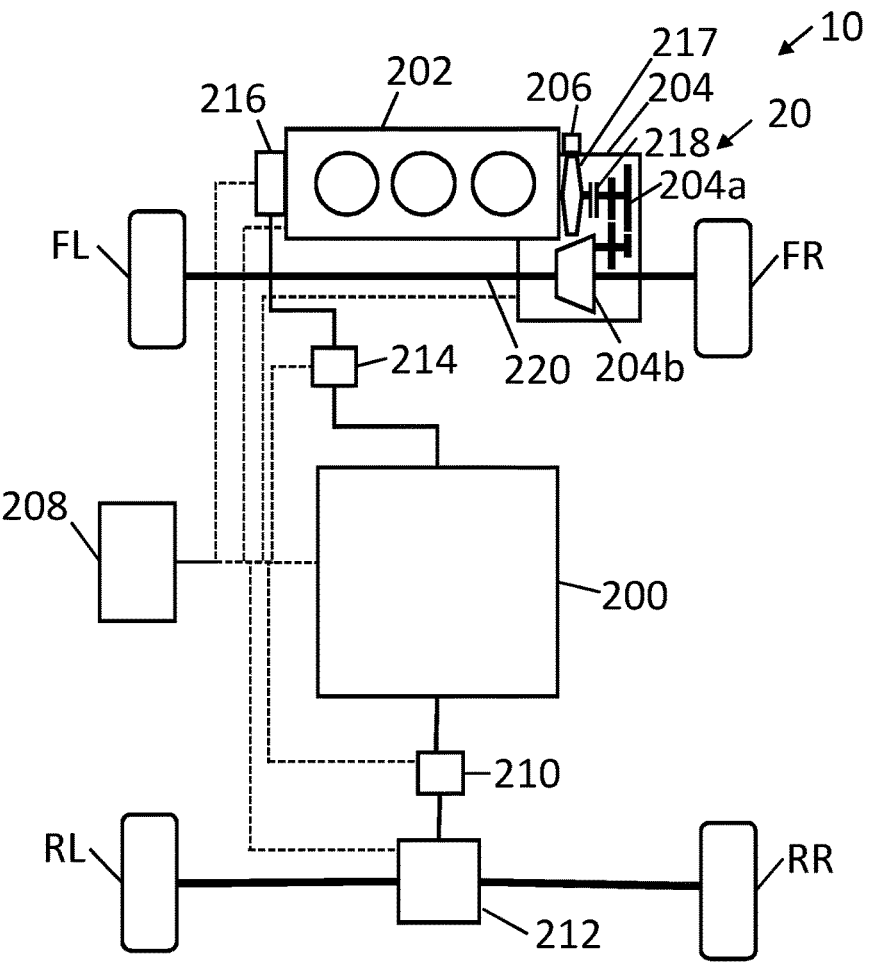
FIG. 2 illustrates an example of a system.

FIG. 2 illustrates a system 20 for an HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises one or more torque sources. A torque source refers to a prime mover, such as an engine, an electric machine, or the like. The illustrated system 20 comprises an engine 202. The engine 202 is a combustion engine. The illustrated engine 202 is an internal combustion engine. The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a vehicle transmission arrangement 204 (transmission) for receiving output torque from the engine 202. The vehicle transmission arrangement 204 may comprise an automatic vehicle transmission, a manual vehicle transmission, or a semi-automatic vehicle transmission. The vehicle transmission arrangement 204 may comprise one or more torque path connectors 218, a torque converter 217, and a gear train 204a. The gear train 204a is configured to provide a selected gear reduction in accordance with a selected gear of the vehicle 10. The gear train 204a may comprise five or more different selectable gear reductions. The gear train 204a may comprise at least one reverse gear and a neutral gear.

The system 20 may comprise a differential 204b which is a second gear train for receiving output torque from the gear train 204a. The differential 204b may be integrated into the vehicle transmission arrangement 204 as a transaxle, or provided separately.

The engine 202 is mechanically connected (coupled) or connectable (couplable) to provide positive torque to a first set of vehicle wheels (FL, FR) via a torque path 220. The torque path 220 extends from an output of the engine 202 to the vehicle transmission arrangement 204, then to axles/driveshafts, and then to first set of vehicle wheels (FL, FR). In a vehicle overrun and/or friction braking situation, negative torque may flow from the first set of vehicle wheels (FL, FR) to the engine 202.

The illustrated first set of vehicle wheels (FL, FR) comprises front wheels, and the axles are front transverse axles. Therefore, the system 20 is configured for front wheel drive by the engine 202. In another example, the first set of vehicle wheels (FL, FR) comprises rear wheels. The illustrated first set of vehicle wheels (FL, FR) is a pair of vehicle wheels, however a different number of vehicle wheels could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 is provided inside and/or outside a bell housing of the vehicle transmission arrangement 204. The torque path connector 218 is configured to connect and configured to disconnect the torque path 220 between the engine 202 and the first set of vehicle wheels (FL, FR). The torque path connector 218 may be a part of the torque converter 217 or gear train 204a, or may be a separate friction clutch. The system 20 may be configured to automatically actuate the torque path connector 218 without user intervention.

The system 20 comprises a first electric machine 216. The first electric machine 216 may be an alternating current induction motor or a permanent magnet motor, or another type of motor. The first electric machine 216 is located so that when the torque path 220 is disconnected from the first set of vehicle wheels (FL, FR), the first electric machine 216 is also disconnected. Alternatively, the first electric machine 216 may be located so that it remains connected to the first set of vehicle wheels (FL, FR).

The first electric machine 216 may be mechanically coupled to the engine 202 via a belt or chain. For example, the first electric machine 216 may be a belt integrated starter generator (BISG). The first electric machine 216 and the engine 202 together form a torque source for the first set of vehicle wheels (FL, FR). In the illustration, the first electric machine 216 is located at an accessory drive end of the engine 202, opposite a vehicle transmission end of the engine 202. In an alternative example, the first electric machine 216 is a crankshaft integrated motor generator (CIMG), located at a vehicle transmission end of the engine 202. A CIMG may be capable of sustained electric-only driving unlike typical BISGs.

The first electric machine 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; generating power for ancillary loads; and/or regenerative braking in a regeneration mode. In a parallel HEV mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202. In further examples, a pinion starter 206 is provided for starting the engine 202.

FIG. 2 illustrates a second electric machine 212, also referred to as an electric traction motor, configured to enable at least an electric vehicle mode comprising electric-only driving. Another term for the second electric machine 212 is an electric drive unit. In some, but not necessarily all examples, a nominal maximum torque of the second electric machine 212 is greater than a nominal maximum torque of the first electric machine 216.

Even if the torque path 220 between the engine 202 and the first set of vehicle wheels (FL, FR) is disconnected, the vehicle 10 can be driven in electric vehicle mode because the second electric machine 212 can remain connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric machine 212 is operable to provide torque to the rear wheels RL, RR via rear transverse axles. Therefore, the vehicle 10 is rear wheel driven in electric vehicle mode. In an alternative example, the second set of vehicle wheels comprises at least one vehicle wheel of the first set of vehicle wheels.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric machine 216 will also be disconnected from the first set of vehicle wheels (FL, FR).

Another benefit of the second electric machine 212 is that the second electric machine 212 may also be configured to operable in a parallel HEV mode, to enable four-wheel drive operation despite the absence of a centre driveshaft.

In order to store electrical energy for the electric machines, the system 20 comprises a traction battery 200. The traction battery 200 provides a nominal voltage required by electrical power users such as the electric machines. If the electric machines run at different voltages, DC-DC converters (not shown) or the like may be provided to convert voltages.

The traction battery 200 may be a high voltage battery. High voltage traction batteries provide nominal voltages in the hundreds of volts, as opposed to traction batteries for mild HEVs which provide nominal voltages in the tens of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10. Energy storage might also be provided by other means such as supercapacitors or kinetic energy storage means such as flywheels, or by a combination of such means.

In some examples, the first electric machine 216 and second electric machine 212 may be configured to receive electrical energy from the same traction battery 200. In another example, the electric machines 212, 216 may be paired to different traction batteries.

Finally, the illustrated system 20 comprises inverters. Two inverters 210, 214 are shown, one for each electric machine. In other examples, one inverter or more than two inverters could be provided.

In some examples, the electrical coupling of the first electric machine 216 and the second electric machine 212 to a same traction battery 200 enables the vehicle 10 to operate in both a series HEV mode and an all-wheel drive parallel HEV mode.

In an alternative implementation, the vehicle 10 may be other than shown in FIG. 2. For example, the first electric machine 216 may be connected through a clutch or gear to the engine 202, or may be located at the opposite end of the engine, possibly within the transmission 204 or on a driveshaft.

Figure 3A:
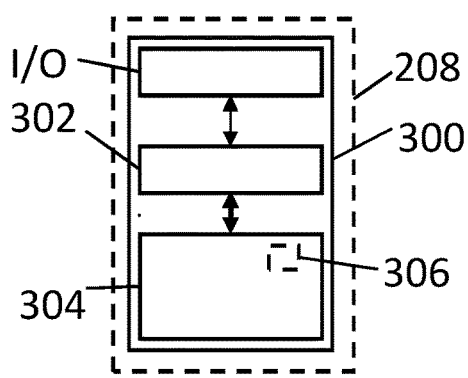
FIGS. 3A, 3B illustrate an example of a control system and of a non-transitory computer-readable storage medium.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

Figure 3B:
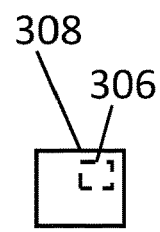

FIG. 3B illustrates a non-transitory computer-readable storage medium 308 comprising the instructions 306 (computer software).

The control system 208 may be configured to provide controller outputs to manipulate a variable (torque) towards a setpoint. An example setpoint is a torque target or a speed target.

Output torque may be manipulated to satisfy at least one torque request. A torque request may be a load for driving the vehicle 10. This type of torque request may be referred to as a vehicle torque request or a total torque request for the whole vehicle, and is not specific to any particular torque source. The total torque request may be for a torque at the vehicle wheels. A load may be based on a driver torque demand (e.g. torque setpoint based on accelerator pedal depression APD), or autonomous driving torque demand, and/or dependent on a speed setpoint such as a cruise control speed setpoint.

Arbitration functions may be applied to change/increase the total torque request to satisfy a plurality of torque requests including load and requests from other vehicle subsystems. A shaping function may smooth the arbitrated total torque request.

The control system 208 may derive, from the shaped arbitrated total torque request, an engine torque request for controlling output torque of the engine, and/or an electric machine torque request(s) for controlling output torque of an electric machine or each electric machine, depending on a vehicle operating mode of the vehicle 10. A required torque split distribution function may control the derivation of the engine torque request and the electric machine torque request, wherein the electric machine is the second electric machine 212.

The required torque split may be a ratio. The torque split in this example is a front:rear torque split, between torque at the front and rear axles. The required torque split helps to maintain all-wheel drive balance of the vehicle 10 (front-biased, rear-biased, or 50:50). In some examples, the required torque split may vary dynamically. The required torque split may depend on variables such as: a driving dynamics mode; a terrain mode and/or a terrain type; vehicle speed; vehicle steering; lateral acceleration; and/or longitudinal acceleration, and/or other factors.

Shaping functions may be applied to smooth the engine and electric machine torque requests around a zero-crossing point (lash crossing), resulting in shaped engine and electric machine torque requests.

A system 20 such as the powertrain of FIG. 2 can be operated in a plurality of vehicle operating modes. In one or more modes, the engine 202 is deactivated and the torque path 220 between the engine 202 and the first set of vehicle wheels (FL, FR) is disconnected. In another one or more modes, the engine 202 is re-activated and the torque path 220 is re-connected. The vehicle 10 may comprise any two or more of the example modes described below.

In electric vehicle mode, the engine 202 is in a deactivated state and the torque path 220 between the first set of vehicle wheels (FL, FR) and the engine 202 is disconnected. In an example, the effect of the combined deactivation and disconnection is that engine speed falls towards zero. Deactivation relates to the engine 202 producing no positive output torque or insufficient positive output torque for driving. Fuel injection may cease, to reduce fuel consumption.

In series HEV mode, the engine 202 is in an activated state but the torque path 220 is disconnected. The engine 202 and the first electric machine 216 generate electrical power, and the second electric machine 212 provides torque to the second set of vehicle wheels (RL, RR).

In parallel HEV mode, the engine 202 is in an activated state and the torque path 220 is connected. In the activated state, fuel is combusted in the engine's combustion chambers, causing the engine 202 to provide positive output torque to the torque path 220. One or both of the electric machines 212, 216 provides torque to vehicle wheels. If the second electric machine 212 is used, all-wheel drive is available. The engine 202 and the first electric machine 216 may optionally generate electrical power.

In an internal combustion engine mode, the engine 202 is in an activated state and the torque path 220 is connected. However, the first and second electric machines 212, 216 are not operable as motors to provide torque to the vehicle wheels. The engine 202 and the first electric machine 216 may optionally generate electrical power. The second electric machine 212 may optionally generate electrical power.

The vehicle operating mode may be selectable manually, semi-automatically, or automatically. A transition condition for changing to a vehicle operating mode that allows more charging than a current mode (e.g. exit electric vehicle mode) may require at least one of: a manual user selection; a traction battery state of charge falling below a threshold; a temperature being below a threshold (e.g. freezing weather); a change of driving dynamics mode; a change of terrain mode; an increase in power consumption due to a high load ancillary device being required to operate, such as an air conditioner unit or a heated windscreen; and/or the like.

A transition condition for changing to a vehicle operating mode that allows more net torque than a current mode and/or all-wheel drive (e.g. parallel HEV mode) may require at least one of: a manual user selection; a torque request rising above a threshold (e.g. kickdown function); a change of driving dynamics mode; a change of terrain mode; and/or the like.

A transition condition for changing to a vehicle operating mode that allows more electric driving than a current mode (e.g. one of the HEV modes or electric vehicle mode) may require at least one of: a manual user selection; a traction battery state of charge rising above a threshold; torque request falling below a threshold; a temperature being above a threshold; a change of driving dynamics mode; a change of terrain mode; and/or the like.

A driving dynamics mode refers to a mode that configures one or more of: a suspension setting; a throttle response setting; a gear shift point setting; a vehicle braking or traction control setting; a torque distribution setting; a torque shaping setting; a steering weighting setting; and/or other settings.

A terrain mode generally refers to vehicle modes optimized for driving over particular driving surfaces. An example of a terrain mode is an off-road terrain mode, arranged to optimize the vehicle for driving over off-road terrain such as may be required when traversing areas of grass, gravel, sand, mud or even crawling over rocks. Another example of a terrain mode is a surface vehicle optimization mode, arranged to optimize the vehicle for driving over low friction surfaces such as snow or ice covered surfaces, either on or off road. A vehicle may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related settings such as a differential locking setting and/or a traction control setting. Additionally, or alternatively, other settings could be adjusted such as: a suspension setting; a ride height setting; a suspension damper setting; a throttle response setting; a gear shift point setting; a vehicle braking or traction control setting; a torque distribution setting; a torque shaping setting; or a steering weighting setting. There may be overlap between driving dynamics modes and terrain modes. The settings may be predetermined or configurable.

A manual user selection may comprise use of a human-machine interface input device. The input device may comprise an engine start button. The input device may comprise a driving dynamics mode selector. The input device may comprise a terrain mode selector. In some examples, a terrain mode and/or driving dynamics mode may be changeable automatically.

Figure 4:
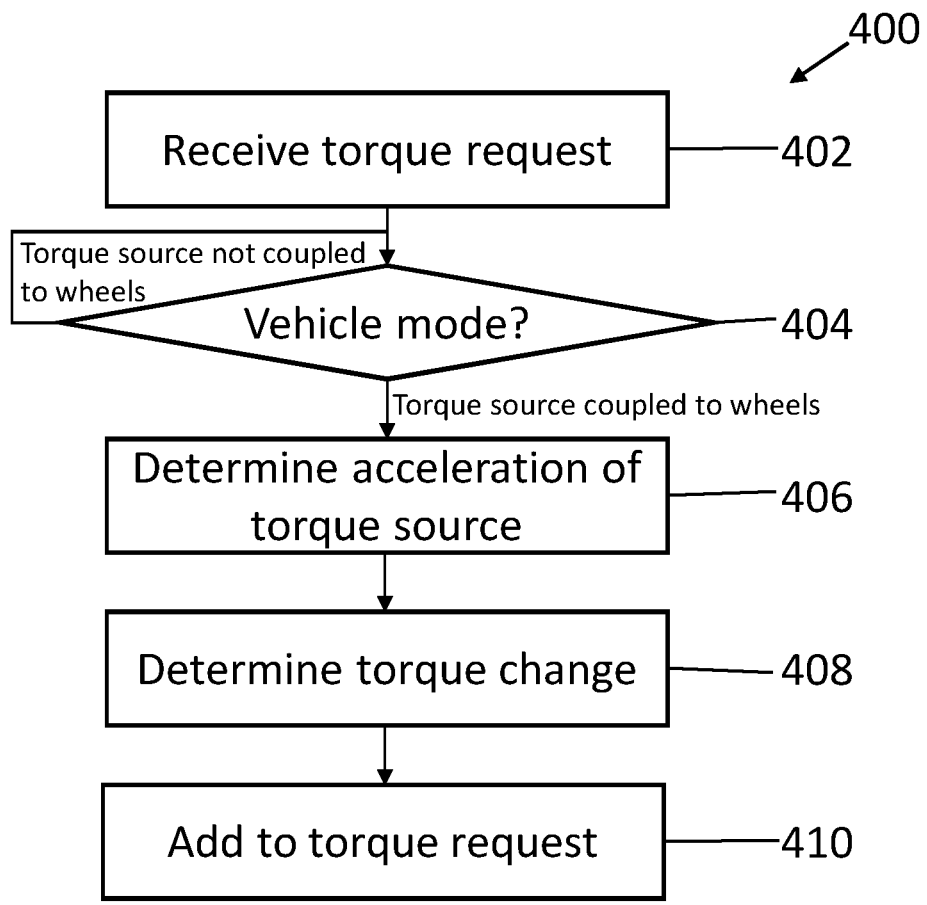
FIG. 4 illustrates an example of a method.

In accordance with an aspect of the invention, FIG. 4 illustrates an example implementation of a computer-implemented method 400, the method comprising at least: determining whether a torque source is coupled to a wheel; and applying a torque change in dependence on angular acceleration associated with the torque source, in dependence on whether the torque source is coupled to the wheel. In this example, the method 400 is performed by the control system 208. The illustrated method 400 comprises additional optional operations. The blocks of the illustrated method 400 are described below.

In the description of the method 400, but not necessarily in all implementations, the torque source is an internal combustion engine 202 couplable to the first set of vehicle wheels FL, FR. A second torque source is the second electric machine 212 coupled to the second set of vehicle wheels RL, RR.

Block 402 of the method 400 comprises receiving a torque request. The torque request may be a load-based torque request. In an example implementation, the load may comprise driver torque demand. Driver torque demand is dependent on accelerator pedal position. Therefore, in this example, acceleration of the vehicle 10 is under manual control. This is because a driver is most likely to perceive inconsistent acceleration as they are depressing the accelerator pedal by an amount that 'feels' right for a desired acceleration. However, the method 400 could be implemented in other scenarios.

Figure 5:
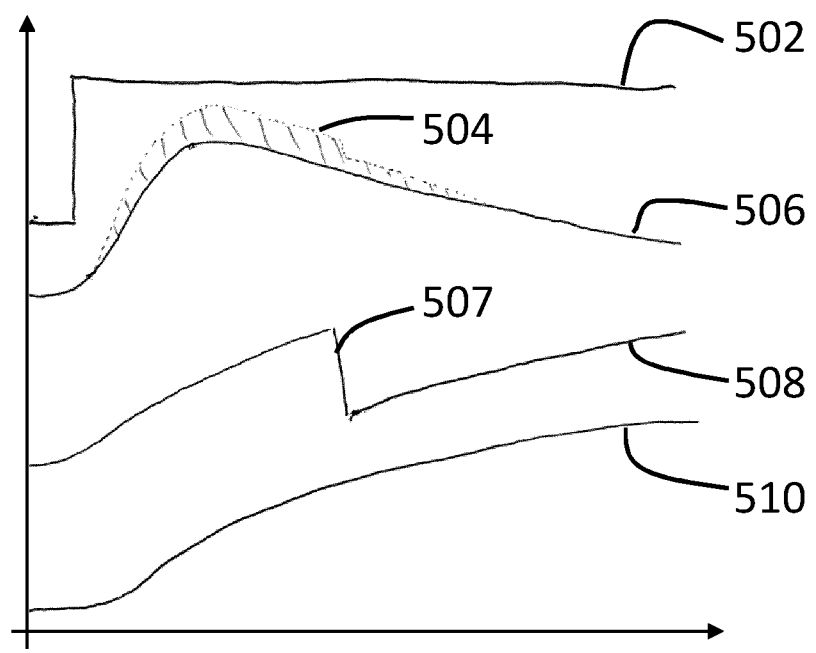
FIG. 5 illustrates a graph according to an example of the disclosure.

FIG. 5 shows accelerator pedal position 502 in the y-axis, with respect to time in the x-axis. For illustrative purposes the accelerator pedal is depressed instantaneously. In real driving scenarios, the depression takes longer.

FIG. 5 also shows the torque request 506 for vehicle wheel torque in the y-axis, aligned with the same time axis. The torque request 506 may be the total torque request, the engine torque request, or the electric machine torque request, depending on vehicle operating mode. The torque request rises following the accelerator pedal depression. Due to an optional torque shaping function, the torque request appears smooth and may decrease after reaching a peak, tending towards a constant value determined by the total torque request.

Block 404 of the method 400 comprises determining whether the vehicle 10 is in a first vehicle operating mode or in a second vehicle operating mode. These will be abbreviated to 'first mode' and 'second mode' respectively. In the first mode, the engine 202 is coupled to the first set of vehicle wheels FL, FR via the torque path 220. Examples of the first mode are the parallel HEV mode, or the internal combustion engine mode. In the second mode, the engine 202 is not coupled to the first set of vehicle wheels FL, FR. In the second mode, the second torque source (second electric machine 212) may be configured to provide torque to the second set of vehicle wheels RL, RR, to satisfy the torque request. Examples of the second mode are the electric vehicle mode, or the series HEV mode. Reasons for disconnecting the engine 202 from the first set of vehicle wheels FL, FR in the second mode include reducing energy losses due to air pumping and engine friction, satisfying a requirement to use electrical energy only, or a response to a fault or no fuel for the engine 202.

In this example use case, total powertrain inertia in the first mode is greater than total powertrain inertia in the second mode because the high-rotating-mass engine 202 is coupled to the wheels FL, FR in the first mode. Therefore, this decision block 404 enables the method 400 to determine whether to apply the torque change, to compensate for the change of inertia associated with a mode change.

In FIG. 4, the method 400 proceeds if the vehicle 10 is in the first mode, and terminates or loops back if the vehicle 10 is in the second mode. This is because the compensating torque change will be added to the torque request while in the first mode.

The modes may change often during real-life driving, and in some cases may change automatically without driver intervention, referring to the earlier examples of entry and exit conditions for the modes. This method 400 is particularly useful for vehicles that may change modes automatically, e.g. due to low battery state of charge. This is because a driver may not be aware of an automatic mode change and therefore should not expect a different vehicle response to a given accelerator pedal input.

It would be appreciated that determining a 'mode' is not the only example of a decision that has the effect of determining whether the engine 202 is coupled to the first set of vehicle wheels FL, FR.

The magnitude of the required torque change is then calculated in blocks 406 and 408 according to the following relationship:

$$\tau = I\alpha$$

In this relationship, $\tau$ is the required torque change. I is the moment of inertia of the engine 202 and optional further components. $\alpha$ is angular acceleration of the engine 202.

The moment of inertia term may be pre-calibrated for the system 20. The moment of inertia term quantifies the moment of inertia of one or more of the components including the engine 202. The components are rotating/reciprocating components to the engine side of the point of decoupling. The point of decoupling may be at the torque path connector 218, the gear train 204a in a neutral gear, or some other location.

In some examples, the moment of inertia term may quantify the moment of inertia of the rotating parts of the engine 202 such as the crankshaft (not shown), and optionally the reciprocating parts of the engine 202 such as the pistons (not shown). Connecting rod geometry may be taken into account. Other engine or driveline ancillaries such as alternators and flywheels (not shown) which are disconnectable from the torque path may be taken into account.

The angular acceleration may be a detected engine angular acceleration. The angular acceleration may be measured at the engine 202 by a sensor (not shown) such as a crank position sensor, although the signal received in this way may be noisy and unstable. A smoother signal may be obtained by obtaining the acceleration from a sensor at or downstream of the vehicle transmission arrangement (transmission) 204, and then converting the signal to engine angular acceleration in dependence on a gear ratio of the gear train 204a. Downstream means towards the vehicle wheels. The sensor could be located at an output of the differential 204b, so that its signal represents vehicle wheel acceleration. The sensor may comprise any shaft speed sensor such as a Hall Effect sensor or equivalent. FIG. 5 illustrates engine speed 508, the gradient of which indicates the engine angular acceleration.

The relationship between the downstream angular acceleration and the engine angular acceleration can be complicated if a torque converter 217 is present. It may be assumed that the torque converter 217 is locked up. In any case, smoothing functions applied to the torque change may damp the effect of the torque converter interaction. Alternatively, the control system 208 may model the torque converter 217 using nonlinear functions of slip ratio and torque capacity.

At block 410, the method 400 comprises applying the torque change in combination with the torque request, comprising adding the compensatory torque change T to the torque request and causing a torque source to provide the resulting modified torque request. FIG. 5 shows the modified torque request 504, which requests additional torque in the first mode to compensate for the additional inertia. In the second mode, the torque request may retain the general shape shown in the line 506, which requests less torque. The net torque at the vehicle wheels FL, FR, RL, RR, and therefore the vehicle acceleration, is approximately the same in both modes for a given accelerator pedal depression.

FIG. 5 also shows engine speed 508 and vehicle speed 510. A brief decrease in engine speed 507 is shown, corresponding to an up-shift of the gear train 204a which is implementation dependent—a gear shift is not always needed and some vehicles do not have transmissions. Torque from the engine 202 may temporarily drop for the gear shift (not shown). The illustrated modified torque request 504 comprises a transient torque change responsive to the gear shift.

The control system 208 may apply a smoothing function such as a low-pass/band-pass filter to the torque change, to reduce the effect of a transient changes in angular acceleration on the torque change.

If the method 400 is applied to the system 20 of FIG. 2, there is flexibility over how the torque change is applied, depending on the specific vehicle operating mode of the vehicle 10 and the desired torque split, if any. If the first mode is the parallel HEV mode, both the engine 202 and the second electric machine 212 are active and therefore one or both of them could apply the torque change. In the system 20 of FIG. 2, parallel HEV mode is effectively a four-wheel drive mode.

The compensatory torque change may be requested for the first set of vehicle wheels FL, FR. If the vehicle is in the parallel HEV mode having a required torque split, the compensatory torque may be requested for the first set of vehicle wheels FL, FR but not the second set of vehicle wheels RL, RR, to help maintain the required front:rear torque split because the inertia change only affects the first vehicle wheels, so compensation at only the front wheels helps to maintain the required torque split.

A numerical illustration of inertia compensation by the second electric machine 212 in the first mode is provided below:

Driver demands 1000 at the wheels, engine capable of providing 600 at the wheels, but inertia component is 100 at the wheels.
  A. Without inertia compensation: engine=600 at the wheels (500 of the demand & 100 inertia), second electric machine=400 at the wheels. Net wheel torque=900 at the wheels.
  B. With inertia compensation: engine=600 at the wheels (500 of the demand & 100 inertia), second electric machine=400+100 added for inertia compensation, at the wheels. Net wheel torque=1000 at the wheels.

In the above example, the method 400 is applied to the system 20 of FIG. 2, because the engine 202 is a significant source of inertia which is removable. However, it would be appreciated that the method 400 could be applied to other vehicle architectures comprising a plurality of torque sources in which one torque source can be decoupled while the other satisfies torque demand. An example is an all-electric vehicle comprising a plurality of electric machines, at least one of which can be decoupled from a wheel or wheels of the vehicle. Another example would be a flywheel hybrid comprising a plurality of flywheels, at least one of which can be decoupled from a wheel or wheels of the vehicle. The decoupling can change the moment of inertia so the method 400 can be applied to compensate for the change.

In some, but not necessarily all examples, block 406 of the method 400 may comprise determining whether the angular acceleration is positive so that speed of the torque source is increasing, or negative so that speed of the torque source is decreasing, wherein the method 400 proceeds to apply the torque change if the angular acceleration is positive, and does not proceed if the angular acceleration is negative. This is because drivers are generally less sensitive to the vehicle response while using the brake pedal than while using the accelerator pedal. However, in some implementations the torque change may also be applied for negative angular accelerations.

The preceding examples refer to a positive torque change that is applied while the vehicle is in the first mode. Alternatively, a negative torque change could be added to the torque request to the second electric machine 212 in the second mode, to increase vehicle deceleration to the level expected if the engine 202 were coupled to the first set of vehicle wheels FL, FR.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method 400 and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for compensating for variable inertia in a vehicle powertrain of a hybrid vehicle having a first torque source comprising an internal combustion engine and a second torque source comprising an electric motor that can drive the vehicle while the first torque source is disconnected from wheels of the vehicle powertrain, the first torque source couplable to a first axle of the hybrid vehicle and the second torque source couplable to a second axle of the hybrid vehicle, the control system comprising one or more controllers, wherein the control system is configured to:
    determine whether a torque source is coupled to a wheel; and
    apply a torque change in dependence on an angular acceleration associated with the first torque source, in dependence on whether the first torque source is coupled to the wheel;
    wherein the torque change is distributed between the first torque source and the second torque source;
    wherein at least part of the torque change is provided by the second torque source; and
    wherein the angular acceleration is obtained by obtaining the acceleration from a shaft speed sensor downstream of at least one gear train of a transmission, and then converting the acceleration to engine angular acceleration in dependence on a gear ratio of the at least one gear train.

2. The control system of claim 1, wherein the torque change is applied in combination with a load-based torque request.

3. The control system of claim 1, wherein the torque change comprises a torque increase applied when the first torque source is coupled to the wheel; and
    wherein at least part of the torque change is provided by the first torque source.

4. The control system of claim 1, configured to determine: whether the vehicle is in a first vehicle operating mode or in a second vehicle operating mode, wherein in the first vehicle operating mode the first torque source is coupled to the wheel, wherein in the second vehicle operating mode the first torque source is not coupled to the wheel.

5. The control system of claim 1, wherein the torque change is further dependent on inertia of the first torque source.

6. The control system of claim 1, configured to determine whether the angular acceleration is positive so that speed of the torque source is increasing, or negative so that speed of the torque source is decreasing, wherein the torque change is applied when the angular acceleration is positive, and wherein the torque change is not applied when the angular acceleration is negative.

7. A system comprising the control system claim 1 and the first torque source.

8. A vehicle comprising the control system of claim 1.

9. A method of compensating for variable inertia in a vehicle powertrain of a hybrid vehicle having a first torque source comprising an internal combustion engine and a second torque source comprising an electric motor that can drive the vehicle while the first torque source is disconnected from wheels of the vehicle, the first torque source couplable to a first axle of the hybrid vehicle and the second torque source couplable to a second axle of the hybrid vehicle, wherein the method comprises:
    determining whether a torque source is coupled to a wheel; and
    applying a torque change in dependence on angular acceleration associated with the first torque source, in dependence on whether the first torque source is coupled to the wheel;
    wherein the torque change is distributed between the first torque source and the second torque source;
    wherein at least part of the torque change is provided by the second torque source; and wherein the angular acceleration is obtained by obtaining the acceleration from a shaft speed sensor downstream of at least one gear train of a transmission, and then converting the acceleration to engine angular acceleration in dependence on a gear ratio of the at least one gear train.

10. A computer product having a non-transitory, computer-readable memory storing computer software that, when executed, is arranged to perform a method according to claim 9.

11. The control system of claim 1, wherein the one or more controllers collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to control determining and the applying.

* * * * *